MAGNETIC SHIELD FOR CATHODE RAY TUBE

Filed July 1, 1965 2 Sheets-Sheet 1

INVENTORS,
RAYMOND S. JOSEPH,
ROBERT B. ASHLEY,
BY William S. Wolfe
HIS ATTORNEY.

INVENTORS:
RAYMOND S. JOSEPH,
ROBERT B. ASHLEY,
BY William S. Wolfe
THEIR ATTORNEY.

United States Patent Office 3,417,201
Patented Dec. 17, 1968

3,417,201
MAGNETIC SHIELD FOR CATHODE RAY TUBE

Raymond S. Joseph, Syracuse, and Robert B. Ashley, North Syracuse, N.Y., assignors to General Electric Company, a corporation of New York
Filed July 1, 1965, Ser. No. 468,834
5 Claims. (Cl. 178—7.82)

ABSTRACT OF THE DISCLOSURE

A magnetic shield of a generally truncated pyramidal shape encircles the funnel portion of a cathode ray tube. The shield includes a plurality of integral spaced tabs, each of which is inserted into a slot in a corresponding bracket. One end of each bracket is then secured to the front of the television receiver cabinet enclosing the cathode ray tube and the magnetic shield structure.

Figure 1:
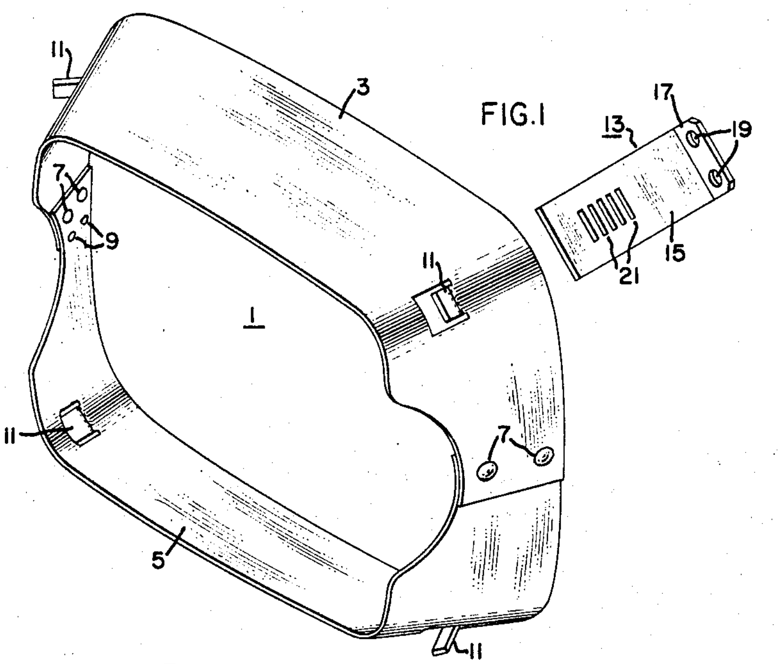

The present invention is directed toward television receivers and more specifically toward an improved magnetic shield for the cathrode ray tube of such receivers.

Color cathode ray tubes are found to be sensitive to spurious magnetic fields which exist in the vicinity of the tube. Thus, magnetic shielding of the tube is necessary to prevent erratic operation which would otherwise be produced by ambient magnetic fields such as the earth's field and spurious fields developed by transformers, motors, etc. However, since the cathode ray tube must be rigidly mounted to the receiver cabinet the presence of a magnetic shield often unduly complicates the apparatus whereby the tube is mounted.

The prior art approaches toward these two somewhat inconsistent considerations have not proven completely satisfactory. Generally, the prior art has required the use of a relatively large and expensive shielding member surrounding the cathode ray tube in conjunction with a completely discrete mounting apparatus for mounting the tube with the shield positioned thereon.

The present invention presents an improved apparatus for both magnetically shielding and mounting a cathode ray tube.

Accordingly, an object of the invention is to provide an improved magnetic shield for a cathode ray tube.

Another object is to provide an improved magnetic shield for a cathode ray tube which is less complex and expensive than prior art devices.

A further object is to provide an improved magnetic shield which also serves as a mount for the cathode ray tube.

These and other objects are achieved in one embodiment of the invention through the use of a magnetic shield of a generally truncated pyramidal shape. The shield is preferably formed from sheet metal so as to conform generally to the funnel portion of the cathode ray tube and is provided with a plurality of spaced outwardly extending mounting tabs. A plurality of mounting brackets are provided, each mounting bracket being affixed to the front of the receiver cabinet and having a plurality of mounting slots therein. One such mounting bracket is associated with each mounting tab of the magnetic shield in such a manner that the mounting tab is received by a mounting slot in the bracket. In this manner the magnetic shield serves to mount the cathode ray tube, the dimensions of the magnetic shield with respect to the cathode ray tube being such that the magnetic shield urges the face plate of the cathode ray tube against a suitable portion of the front of the receiver cabinet.

In accordance with a preferred embodiment of the invention the magnetic shield is formed in two essentially identical sections having holes therein adapted to receive rivets for joining the two sections together. Extra holes are provided in one part of the shield to allow for adjustment of the shield size to compensate for tube size variations. Similarly, the mounting brackets are provided with a plurality of mounting slots for adjustment purposes in order to compensate for tube size variations and insure the requisite rigid mount.

Figure 3:
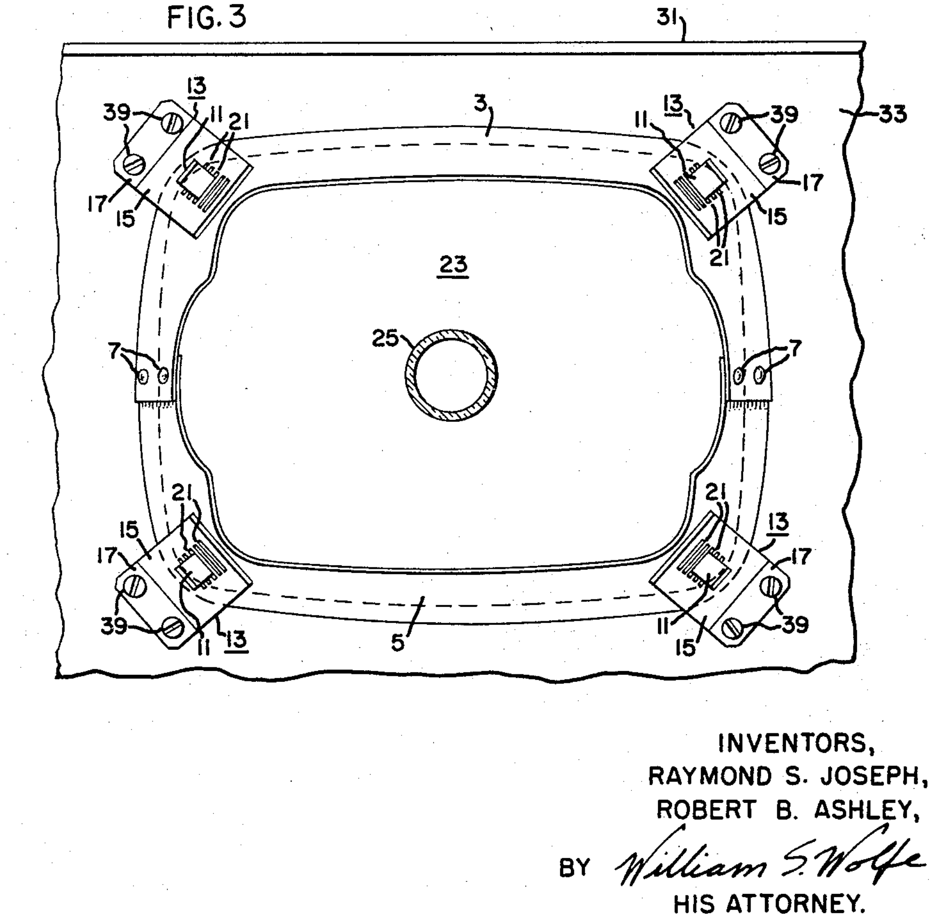
Figure 2:
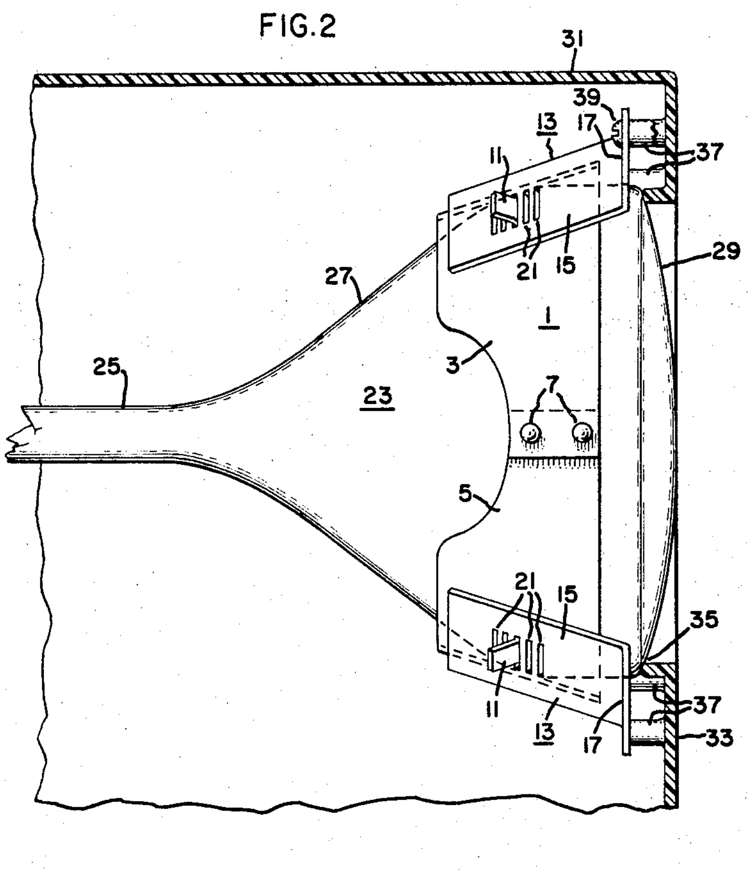

The novel and distinctive features of the invention are set forth in the appended claims. The invention itself, together with further objects and advantages thereof, may thus be understood by reference to the following description and accompanying drawings in which:

FIGURE 1 is a perspective view of the magnetic shield in accordance with the invention, FIGURE 2 is a partial side sectional view of a television receiver including a cathode ray tube mounted through the use of the magnetic shield of FIGURE 1, and FIGURE 3 is a rear view of the apparatus shown in FIGURE 2.

Referring to FIGURE 1, there is shown generally at 1 a magnetic shield in accordance with the invention, the shield having a generally truncated pyramidal shape. Preferably, the shield 1 of the invention is stamped from sheet metal in two essentially identical sections 3 and 5.

Section 3 of the shield 1 is assembled to section 5 through the use of rivets 7 passing through suitable holes in each of the sections to complete the assembly. Extra rivet receiving holes 9 are provided to allow adjustment of the shield size to compensate for variations in tube size, the rivets 7 being received by the holes 9 when a smaller cross-section shield is required.

The magnetic shield 1 is further provided with a plurality of outwardly extending mounting tabs 11, one such mounting tab being positioned at each corner of the shield 1 and preferably being formed by a simple lancing operation.

A plurality of mounting brackets generally shown at 13 is provided, one such mounting bracket being associated with each mounting tab 11 of the magnetic shield 1. Each mounting bracket 13 comprises a flat strap portion 15 having an upturned end 17. The upturned end 17 is provided with a plurality of screw receiving holes 19, these holes being adapted to receive screws for mounting the bracket to the receiver cabinet. The flat strap portion 15 is provided with a plurality of spaced mounting slots 21, each slot being adapted to receive the associated mounting tab 11. Through the use of a plurality of slots in this manner, a suitable slot may be selected to receive the mounting tab 11 to provide mounting of a particular cathode ray tube even though the dimensions of such tubes vary rather widely.

Referring to FIGURE 2 and 3 there is shown generally at 23 a cathode ray tube mounted through use of the magnetic shield 1 of FIGURE 1. The cathode ray tube 23 comprises a neck portion 25, a funnel portion 27 and a face plate portion 29. As depicted the magnetic shield 1 is utilized for mounting the cathode ray tube 23 within a television receiver cabinet including a top portion 31 and a front portion 33. The front portion 33 includes a seat 35 for the face plate 29 of the mounted cathode ray tube 23 and is provided with a plurality of inwardly extending screw receiving bosses 37.

As depicted, the assembled magnetic shield 1 is positioned about the funnel portion 27 of the cathode ray tube. The mounting brackets 13 are assembled to the associated bosses 37 through the use of suitable screws 39 after the mounting tabs 11 have been inserted in the appropriate slot 21. In this manner, the shield exerts a force on the funnel portion of the cathode ray tube which urges the cathode ray tube into firm abutment with the seat 35 and a rigid mount is achieved in inexpensive and reliable fashion.

Thus, in accordance with the invention a magnetic shield serves to both shunt spurious magnetic fields away from the various electron beams and provide the sole means by which the cathode ray tube is mounted.

Although the invention has been described with respect to certain specific embodiments, it will be appreciated that modifications and changes may be made by those skilled in the art without departing from the true spirit and scope of the invention.

What is claimed and desired to be secured by Letters Patent of the United States is:

1. In a television receiver including a cabinet having positioned therein a cathode ray tube including a tapered funnel portion, a magnetic shield for the cathode ray tube comprising:

(a) a magnetic shielding member surrounding the funnel portion of the cathode ray tube and in substantial engagement therewith, said member having a generally truncated pyramidal shape at all areas of engagement and capable of substantial shielding of the earth's magnetic field, (b) said magnetic shielding member including mounting means positioned thereon, and (c) means positioned on said cabinet for engaging the mounting means of said magnetic shielding member to mount the cathode ray tube to the cabinet.

2. In a television receiver including a cabinet having positioned therein a cathode ray tube including a tapered funnel portion, a magnetic shield for the cathode ray tube comprising:

(a) a generally truncated pyramidal shaped sheet metal member surrounding and generally conforming to the funnel portion of the cathode ray tube in substantial engagement therewith, (b) said sheet metal member including a plurality of outwardly extending mounting tabs, (c) a plurality of mounting brackets each bracket having a slot therein, (d) said mounting brackets being mounted to said cabinet with the slot in each of said brackets receiving one of said mounting tabs to mount the cathode ray tube to the cabinet.

3. The magnetic shield defined in claim 2 wherein each of said mounting brackets is provided with a plurality of spaced slots therein, a particular one of the slots being selected to receive the associated mounting tab in accordance with the size of the cathode ray tube to be mounted.

4. The magnetic shield defined in claim 2 wherein said sheet metal member comprises two essentially identical flat sheet metal portions connected together to form said truncated pyramidal shape.

5. The magnetic shield defined in claim 3 wherein said flat sheet metal portions are riveted together.

References Cited

UNITED STATES PATENTS

| | | | |
|---|---|---|---|
| 3,369,074 | 2/1968 | Massa | 178—7.82 |
| 2,456,399 | 12/1948 | Gethmann | 178—7.8 |
| 2,497,078 | 2/1950 | Gall | 178—7.8 |
| 2,797,408 | 6/1957 | Greatbatch | 178—7.82 |
| 2,970,311 | 1/1961 | De Napoli et al. | 178—7.8 |
| 3,240,876 | 3/1966 | Whitney | 178—7.82 |
| 3,297,823 | 1/1967 | Neubauer | 178—7.82 |
| 3,248,480 | 4/1966 | Browning et al. | 178—7.8 |
| 3,340,358 | 9/1967 | De Gier et al. | 178—7.82 |

ROBERT L. GRIFFIN, *Primary Examiner.*

R. K. ECKERT, *Assistant Examiner.*

U.S. Cl. X.R.

178—7.8